US008799891B2

(12) United States Patent
Cherkasova et al.

(10) Patent No.: US 8,799,891 B2
(45) Date of Patent: Aug. 5, 2014

(54) SYSTEM AND METHOD FOR ATTRIBUTING CPU USAGE OF A VIRTUAL MACHINE MONITOR TO A CORRESPONDING VIRTUAL MACHINE

(75) Inventors: Ludmila Cherkasova, Sunnyvale, CA (US); Robert D. Gardner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3337 days.

(21) Appl. No.: 11/070,602

(22) Filed: Mar. 2, 2005

(65) Prior Publication Data

US 2006/0200819 A1 Sep. 7, 2006

(51) Int. Cl.
*G06F 9/455* (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | | |
|---|---|---|---|---|
| 5,016,170 | A | * | 5/1991 | Pollalis et al. ..................... 705/7 |
| 5,257,386 | A | * | 10/1993 | Saito .............................. 712/225 |
| 5,408,617 | A | | 4/1995 | Yoshida |
| 5,675,762 | A | | 10/1997 | Bodin et al. |
| 5,745,837 | A | | 4/1998 | Fuhrmann |
| 6,266,804 | B1 | * | 7/2001 | Isman ............................ 717/125 |
| 6,463,352 | B1 | | 10/2002 | Tadokoro et al. |
| 7,082,598 | B1 | | 7/2006 | Le et al. |
| 7,203,944 | B1 | * | 4/2007 | van Rietschote et al. ...... 718/104 |
| 7,225,441 | B2 | * | 5/2007 | Kozuch et al. .................... 718/1 |
| 7,246,159 | B2 | * | 7/2007 | Aggarwal et al. ............. 709/220 |
| 7,272,831 | B2 | * | 9/2007 | Cota-Robles et al. ............. 718/1 |
| 7,299,468 | B2 | * | 11/2007 | Casey et al. .................... 718/104 |
| 2005/0216920 | A1 | * | 9/2005 | Tewari et al. .................. 719/324 |
| 2005/0268298 | A1 | * | 12/2005 | Hunt et al. ......................... 718/1 |
| 2006/0085784 | A1 | | 4/2006 | Traut et al. |
| 2006/0085792 | A1 | | 4/2006 | Traut |
| 2006/0200821 | A1 | | 9/2006 | Cherkasova et al. |
| 2007/0130566 | A1 | | 6/2007 | van Rietschote et al. |

OTHER PUBLICATIONS

Garfinkel, T., Rosenblum, M. "A Virtual Machine Introspection Based Architecture for Intrusion Detection", Computer Science Department, Stanford University, 2003.*
Fraser, K. et al., "Reconstructing I/O", A Technical Report, Aug. 2004 [online] Retrieved from: http://www.cl.cam.ac.uk/TechReports/UCAM-CL-TR-596.pdf, 16 pages.
"XEN The XEN virtual machine monitor", University of Cambridge, [online] [Retrieved on Feb. 21, 2005] 1 page Retrieved from: http://www.cl.cam.ac.uk/Research/SRG/netos/xen/downloads.html.

(Continued)

*Primary Examiner* — Gregory A Kessler

(57) ABSTRACT

According to at least one embodiment, a method comprises observing communication from a virtual machine (VM) to a virtual machine monitor (VMM). The method further comprises determining, based on the observed communication, CPU utilization of the VMM that is attributable to the VM. According to at least one embodiment, a system comprises a Central Processing Unit (CPU), Virtual Machines (VMs), and a Virtual Machine Monitor (VMM) operable to receive requests for resource access from the VMs. The system further comprises a CPU utilization monitor operable to determine an amount of CPU utilization of the VMM in processing the received requests that is attributable to each of the VMs.

32 Claims, 3 Drawing Sheets

(56) References Cited

OTHER PUBLICATIONS

Kallahalla, M. et al., "SoftUDC: A Software-Based Data Center for Utility Computing", 2004 IEEE, Published by the IEEE Computer Society, pp. 38-46.
Barham, P. et al., "Xen and the Art of Virtualization", University of Cambridge Computer Laboratory, SOSP Oct. 19, 2003, 14 pages.
LeVasseur et al~Unmodified Device Driver Reuse and Improved System Dependability via Virtual Machines~Proc Operating Sys Design/Implementation~Dec. 2004~14 pages.
McIlroy, Ross~Masters Research Thesis~Network Router Resource Virtualisation~University of Glasgow~Dec. 17, 2004~24 pages.

* cited by examiner

SYSTEM AND METHOD FOR ATTRIBUTING CPU USAGE OF A VIRTUAL MACHINE MONITOR TO A CORRESPONDING VIRTUAL MACHINE

CROSS-REFERENCE TO RELATED APPLICATIONS

This application is related to concurrently filed and commonly assigned U.S. patent application Ser. No. 11/070,605 entitled "SYSTEM AND METHOD FOR ATTRIBUTING TO A CORRESPONDING VIRTUAL MACHINE CPU USAGE OF A DOMAIN IN WHICH A SHARED RESOURCE'1 DEVICE DRIVER RESIDES", and 11/070,674 entitled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES', the disclosures of which are hereby incorporated herein by reference.

FIELD OF THE INVENTION

The below description is related generally to monitoring of resource utilization, and more particularly to attributing CPU usage of a virtual machine monitor to a corresponding virtual machine that caused such CPU usage by the virtual machine monitor.

DESCRIPTION OF RELATED ART

Traditionally, general-purpose operating systems assume that they have complete control of a system's physical resources. The operating system ("OS") thus assumes responsibility for such system management as allocation of physical resources, communication, and management of external storage, as examples. Virtualization changes this assumption of sole responsibility by a single OS for management of the system. Similar to the way that a general-purpose OS presents the appearance to multiple applications that each has unrestricted access to a set of computing resources, a virtual machine manages a system's physical resources and presents them to one or more OSs, thus creating for each OS the illusion that it has full access to the physical resources that have been made visible to it.

The current trend toward virtualized computing resources and outsourced service delivery has caused interest to surge in Virtual Machine Monitors (VMMs) that enable diverse applications to run in isolated environments on a shared hardware platform. A VMM is a layer of software that runs on a host platform and provides an abstraction of a complete computer system to higher-level software. That is, a VMM, which may also be referred to as a "hypervisor," is a software layer that virtualizes the available resources of a computer and multiplexes them among one or more guest OSs on the computer system. Many such VMMs are available in the art, such as the VMM known as VMWARET™ available from VMware, Inc. (see the Internet web site located at URL address having the word "vmware" prefixed by "www." and suffixed by ".com". An abstraction created by VMM is called a virtual machine (VM). Accordingly, a VMM aids in subdividing the ample resources of a modern computer and creating the illusion of multiple virtual machines each running a separate OS instance.

Typically, VMMs are classified into two groups: 1) "Type I VMMs" that run directly on physical hardware and thus provide an abstraction that is identical to the hardware underneath the VMM, such as IBM's VM/370; and 2) "Type II VMMs" that run as an application on a host operating system, such as user-mode Linux. Type I and Type II machines are available in the art. For instance, VMWare, Inc. provides both types of VMMs. In a traditional Type I VMM, the exposed virtual hardware functionality is identical to the underlying machine. This "full virtualization" has the main benefit of allowing unmodified OSs to be hosted. However, support for full virtualization was never a part of prevalent IA-32 (e.g., x86) architecture, and the efficient virtualization is difficult, i.e., it can be only achieved at the cost of increased complexity and reduced performance.

Several aspects of virtualization make it difficult or slow for a VMM to provide an interface that is identical to the physical hardware. For instance, some architectures include instructions whose behavior depends on whether the CPU is running in privileged or user mode (sensitive instructions), yet which can execute in user mode without causing a trap to the VMM. Virtualizing these sensitive-but-unprivileged instructions generally requires binary instrumentation, which adds significant complexity and may add significant overhead. For example, VMware's ESX Server dynamically rewrites portions of the hosted machine code to insert traps wherever VMM intervention might be required. In addition, emulating I/O devices at the low-level hardware interface (e.g. memory-mapped I/O) causes execution to switch frequently between the guest OS accessing the device and the VMM code emulating the device. To avoid the overhead associated with emulating a low-level device interface, most VMMs encourage or require the user to run a modified version of the guest OS. For example, the VAX VMM security kernel, VMware Workstation's guest tools add special drivers in the guest OS to accelerate the virtualization of some devices.

A new virtualization technique, called paravirtualization, has been recently introduced, that avoids the drawbacks of full virtualization by presenting a virtual model machine abstraction that is similar but not identical to the underlying hardware. This technique provides improved performance, but it also requires modification to the guest OSs, i.e. the commodity system needs to be ported to a paravirtualized environment. XEN™ is an example of a known VMM for x86 based on the paravirtualization technique, which supports execution of multiple guest OSs and that does not require changes to the application binaries interfaces (ABI), and hence no modifications are required to guest applications. XEN™ is an open source VMM, and the latest stable release of XEN™ is version 2.0.3, which is available as of the filing of this application at the Internet web site located at the URL address having the phrase "cl.cam.ac.uk/Research/SRG/netos/xen/downloads" prefixed by "www." and suffixed by ".html".

For various reasons, including without limitation management of resource allocation, it is often desirable to monitor the CPU utilization that is attributable to each of the virtual machines (VMs) that may be implemented on a system. Traditional monitoring techniques report the amount of CPU allocated by the scheduler for execution of a particular VM over time. However, this method often fails to reveal the "true" usage of the CPU that is attributable to different VMs. Thus, a desire exists for a system and method for accurately determining CPU utilization that is attributable to VMs on a system.

DETAILED DESCRIPTION

Figure 1:
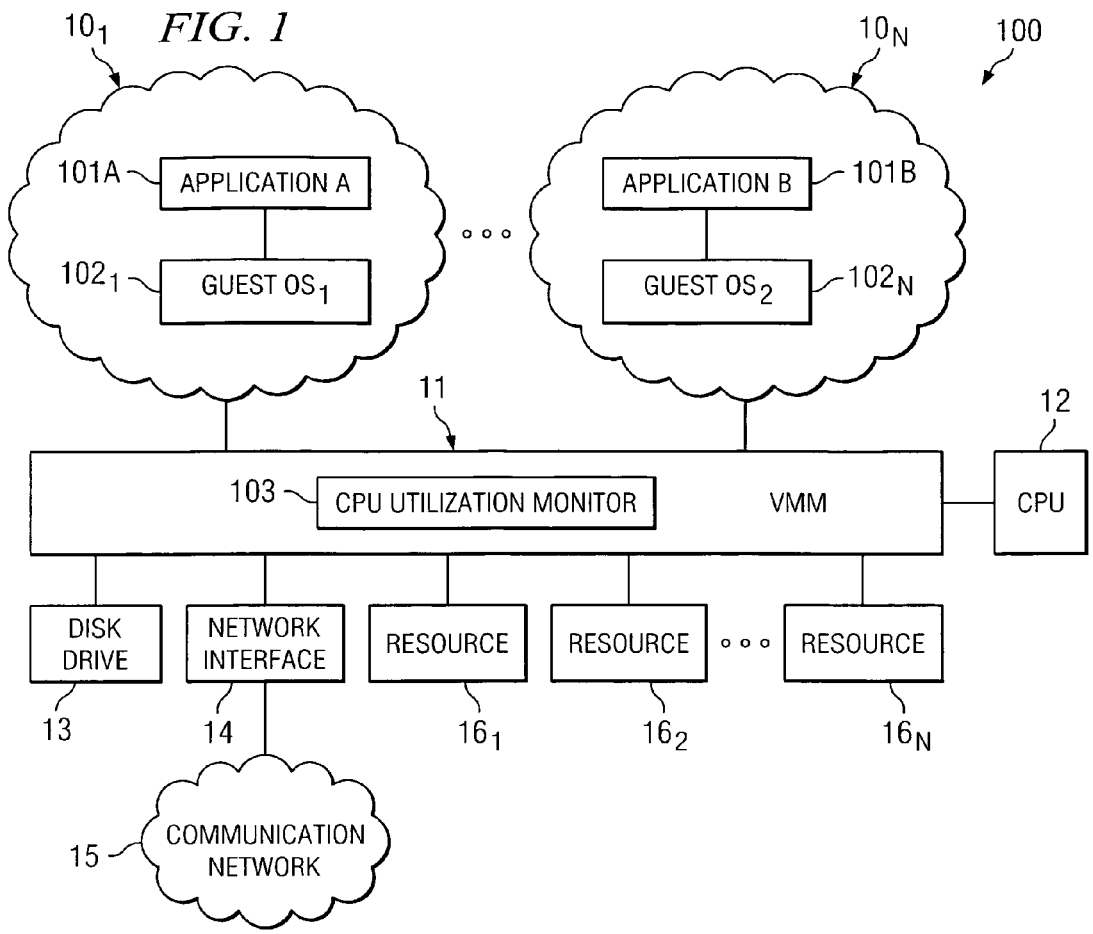
FIG. 1 shows an exemplary embodiment of the present invention.

As described above, virtualization enables resources to be shared between a plurality of VMs. A VMM is a software layer that virtualizes the available resources of a computer system and multiplexes them among one or more guest OSs on the computer system. As used herein, the term guest operating system refers to one of the OSs that the VMM can host, and the term domain refers to a running virtual machine within which a guest OS executes. Thus, the terms virtual machine (VM) and domain are used interchangeably herein. The VMM may be referred to as a hypervisor because it operates at a higher privilege level than the supervisor code of the guest OSs that it hosts. Thus, the terms VMM and hypervisor are used interchangeably herein.

For various reasons, including without limitation management of resource allocation, it is often desirable to monitor the CPU utilization that is attributable to each of the VMs that may be implemented on a system. Traditional monitoring systems typically report the amount of CPU allocated by the scheduler for execution of a particular VM over time. However, this method often fails to reveal the "true" usage of the CPU by different VMs. More particularly, the CPU utilization of the VMM in servicing the requests of each VM (requesting to access a resource) are not attributed to the corresponding VMs in this technique. Thus, the full CPU utilization of the VMs, including the corresponding VMM CPU utilization, is not determined. For example, virtualization of input/output (I/O) devices results in an I/O model where the data transfer process involves additional system components, such as the VMM. Hence, the CPU usage when the VMM handles the I/O data on behalf of a particular VM should be charged to the corresponding VM. However, simply monitoring the CPU utilization allocated by the scheduler to the corresponding VM fails to account for the CPU utilization of the VMM in handling the I/O data on behalf of such corresponding VM. Thus, the traditional technique of determining CPU utilization of each VM does not fully capture the CPU utilization attributable to a VM, as it fails to account for the corresponding VMM CPU utilization that is performed for each VM.

Embodiments of the present invention provide a system and method for attributing VMM CPU utilization to corresponding VMs. More specifically, embodiments provided herein monitor communications between a VM and VMM, and based on such communications determine an amount of CPU utilization of the VMM that is attributable to the VM. In certain embodiments, the communications monitored are requests from a VM requesting access to shared resources, such as I/O resources. In a paravirtualized environment, such requests may be made from the VM to the VMM. For example, the guest OSs may be adapted to include a virtual device interface for accessing certain resources via the VMM. In other implementations of virtualization, such as in a fully-virtualized environment, the VM may not make a request to the VMM (e.g., the guest OS may not be adapted to communicate with the VMM) but instead the VMM may intercept requests by the VM to access resources. Such intercepted communications are encompassed by the communications between the VM and VMM described herein, and may be used in certain embodiments for determining the amount of VMM CPU utilization that is attributable to the corresponding VM. Thus, embodiments of the present invention are applicable for determining the amount of CPU utilization of a VMM that is attributable to each VM implemented on the system, and the embodiments described herein may be employed for any type of virtualization framework, including without limitation full virtualization and paravirtualization frameworks.

In certain implementations, a plurality of VMs (or "domains") may be implemented on a system, and the VMM may multiplex access to shared resources, such as I/O resources, among the VMs. Embodiments of the present invention provide a system and method for attributing VMM CPU utilization to the appropriate VMs (e.g., attribute the VMM CPU utilization to the corresponding VMs that caused the VMM CPU utilization). More specifically, embodiments provided herein monitor communications between each of the VMs and the VMM, and, based on such communications, determine an amount of CPU utilization of the VMM that is attributable to each of the VMs. Thus, the appropriate amount of the VMM CPU utilization that is attributable to servicing requests from a given VM is attributed to such given VM. For instance, if the VMM utilizes the CPU to process a resource access request of a first VM, this CPU utilization of the VMM is attributed to the first VM; and if the VMM utilizes the CPU to process a resource access request of a second VM, this CPU utilization of the VMM is attributed to the second VM.

Further, embodiments of the present invention may be employed for various types of virtualization architectures. Exemplary implementations are described further herein, with reference to FIGS. 3 and 4, in which device drivers that enable access to certain resources (e.g., I/O resources) are placed in the VMM. Examples of known virtualization architectures in which the device drivers are placed in the VMM include without limitation the XEN™ VMMs commercially known as Xeno version 1.0, Xeno version 1.1, and Xeno version 1.2, which are each available as of the filing of this application at the Internet web site located at the URL address having the word "bkbits" prefixed by "xen." and suffixed by ".net". The concepts presented herein may be employed for other virtualization architectures, as well, such as architectures in which device drivers that enable access to certain resources (e.g., I/O resources) are placed in a privileged management domain, such as described further in the exemplary embodiments of concurrently filed and commonly assigned U.S. patent application Ser. No. 11/070,605 titled "SYSTEM AND METHOD FOR ATTRIBUTING TO A CORRESPONDING VIRTUAL MACHINE CPU USAGE OF A DOMAIN IN WHICH A SHARED RESOURCE'S DEVICE DRIVER RESIDES", the disclosure of which is hereby incorporated herein by reference. Another exemplary virtualization architecture in which the concepts presented herein may be employed is an architecture in which device drivers that enable access to certain resources (e.g., I/O resources) are placed in isolated driver domains, such as described further in the exemplary embodiments of concurrently filed and commonly assigned U.S. patent application Ser. No. 11/070,674 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the disclosure of which is hereby incorporated herein by reference.

In certain embodiments, the amount of CPU utilization that is scheduled for a VM is determined, and the amount of CPU utilization of the VMM that is attributable to such VM is determined. The scheduled CPU utilization of the VM and the determined CPU utilization of the VMM that is attributable to the VM are then summed to compute the total CPU utilization of the VM.

Turning to FIG. 1, an exemplary embodiment of the present invention is shown. As shown, computer system 100 has any number "N" of VMs or "domains" $10_1, \ldots, 10_N$ implemented thereon (referred to collectively as VMs 10). Such virtualization may be achieved utilizing any suitable technique now known or later discovered. Within each VM 10, a guest OS is executing, such as guest $OS_1$ $102_1$ in VM 101 and guest $OS_N$ $102_N$ in VM $10_N$. Further, one or more applications may be executing within each VM 10, such as application A 101A in VM $10_1$ and application B 101B in VM $10_N$. VMM 11 is implemented, which is a software layer that virtualizes the available resources of computer system 100 and multiplexes them among the various VMs 10 (e.g., the various guest OSs) on the computer system.

System 100 further includes CPU 12, and various shared resources of which VMM 11 manages access by the various VMs 10. Such shared resources include I/O resources, such as disk drive 13 (e.g., hard drive, floppy drive, tape drive, optical drive, SCSI interface, IDE, etc.) and network interface 14 (e.g., any of a variety of different network interface cards (NICs) and/or adapters), which enables system 100 to interface to communication network 15 (which may be a local area network (LAN), the Internet or other Wide Area Network (WAN), an intranet, a wireless network, telephony network, any combination of the aforementioned networks, and/or any other communication network now known or later developed within the networking arts which permits two or more computers to communicate with each other). The shared resources may include any number of other resources $16_1, 16_2, \ldots, 16_N$ to which VMM 11 manages access of the VMs 10, examples of which include without limitation memory (e.g., RAM) and block data storage (e.g., disks).

As described above, VMM 11 is a software layer that is commonly implemented in virtualization architectures, which virtualizes the available resources of computer system 100 and multiplexes them among the various VMs 10. Thus, to access certain resources, the VMs 10 communicate with the VMM 11 (e.g., either directly, as in a paravirtualized system, or via the VMM intercepting communication of the VMs, as in many fully-virtualized systems). That is, in certain implementations, the system is paravirtualized, in which the guest OS of each VM 10 is adapted in some manner to communicate with VMM 11. A more specific example of a paravirtualized system is described below with FIG. 3. In other implementations, the guest OSs may not be so adapted, but instead the VMM 11 may act to intercept certain resource accesses attempted by the guest OSs, in which case embodiments of the present invention may be employed to monitor the intercepted communications just as the communications from a paravirtualized guest OS and the VMM may be monitored.

As also mentioned above, it is often desirable to measure resource utilization by the VMs 10. Available memory per VM 10 is typically statically allocated during the deployment stage and thus can be directly accounted for. Network and storage bandwidth usage can also be accounted by directly observing the amount of traffic transferred in/out of the particular VM. However, measuring the CPU usage by a particular VM 10 is not a straightforward task. VMM 11 often includes a scheduler that schedules CPU utilization for each of the VMs 10. As described above, however, monitoring the CPU utilization scheduled for each VM 10 often fails to fully account for all CPU utilization that should be attributed to each VM 10 because it fails to account for the CPU utilization of the VMM 11 in servicing the corresponding resource access requests of each VM 10.

Accordingly, embodiments of the present invention implement a CPU utilization monitor 103 that determines, for each of the VMs 10, a corresponding amount of CPU utilization of VMM 11 that is attributable to such VM 10. More specifically, CPU utilization monitor 103 monitors the communications (e.g., the resource access requests) between each of the VMs 10 and the VMM 11, and based on such communications determines an amount of CPU utilization of the VMM 11 that is attributable to each of the VMs 10. Again, such monitored communications may be directed from the guest OS of a VM 10 to the VMM, as in a paravirtualized environment, or the monitored communications may be resource accesses from a guest OS that are intercepted by the VMM, as in a non-paravirtualized environment (e.g., a fully-virtualized environment).

Figure 2:
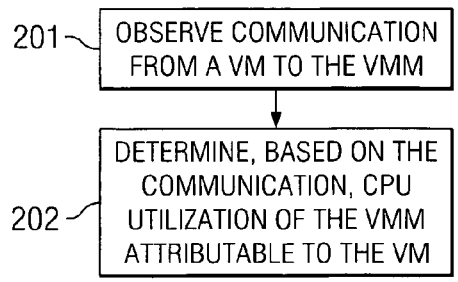
FIG. 2 shows an exemplary operational flow according to one embodiment of the present invention.

Turning to FIG. 2, an exemplary operational flow according to one embodiment is shown. In operational block 201, CPU utilization monitor 103 observes communication from a VM 10 to the VMM 11. As described further herein, in certain embodiments the communication under observation are resource access requests from the VMs 10 to the VMM 11, such as I/O resource access requests. In operational block 202, CPU utilization monitor 103 determines, based on the observed communication, CPU utilization of the VMM 11 that is attributable to the VM 10. Accordingly, by monitoring the communications from each of the VMs $10_1, \ldots, 10_N$ to the VMM 11, CPU utilization monitor 103 is capable of attributing the corresponding amount of CPU utilization of the VMM 11 for servicing the communications (e.g., access requests) to the appropriate VMs $10_1, \ldots, 10_N$. Thus, in certain embodiments a more accurate accounting of the full CPU utilization of each VM 10 is provided by CPU utilization monitor 103, wherein such accounting includes both the scheduled CPU utilization for each VM 10 and the corresponding amount of VMM CPU utilization that is attributable to each VM 10.

Exemplary techniques that may be employed by CPU utilization monitor 103 for determining the CPU utilization of a VM 10, including the amount of CPU utilization by the VMM 11 that is attributable to such VM 10, are described further below. As described further below, in certain embodiments, a light-weight monitoring technique is provided for measuring the CPU usage of different VMs 10, including the corresponding CPU overhead of the VMM 11 caused by processing (e.g., I/O processing) on behalf of a particular VM 10. This monitoring system can be used, as examples, for assistance in billing and/or for a whole variety of management tasks, such as: a) support of policy-based resource allocation; b) admission control of new VMs; c) support for VMs migration; and d) quality of service ("QoS") provisioning of VMs.

Since the virtual machine technology allows different customers to share and utilize the same machine resources, the performance monitoring system provided herein, which accurately attributes the resource usage to different VMs, may be very important for certain management tasks. As one example, a virtual machine architecture, such as the exemplary XEN™ architecture described further below with FIGS. 3-4, may be used to create isolated virtual clusters out of existing machines in a data center that may be shared across different administrative units in an enterprise. Managing this virtual IT infrastructure and adapting to changing business needs presents a challenging task. In certain implementations of such virtual cluster system, virtual machines (VMs) can be migrated from one physical node to another when the current physical node capacity is insufficient, or for improving the overall performance of the underlying infrastructure. To support these management functions, an accurate monitoring infrastructure for reporting resource usage of different VMs becomes desirable. The CPU utilization monitor described herein may be advantageously employed for use in management of such a system, for example. Of course, embodiments of the CPU utilization monitor described herein may be employed for various types of applications (e.g., billing, resource utilization management, etc.) in any type of virtualized system that may be implemented, and thus is not limited in application to resource allocation management in the above-mentioned virtual cluster system.

Figure 3:
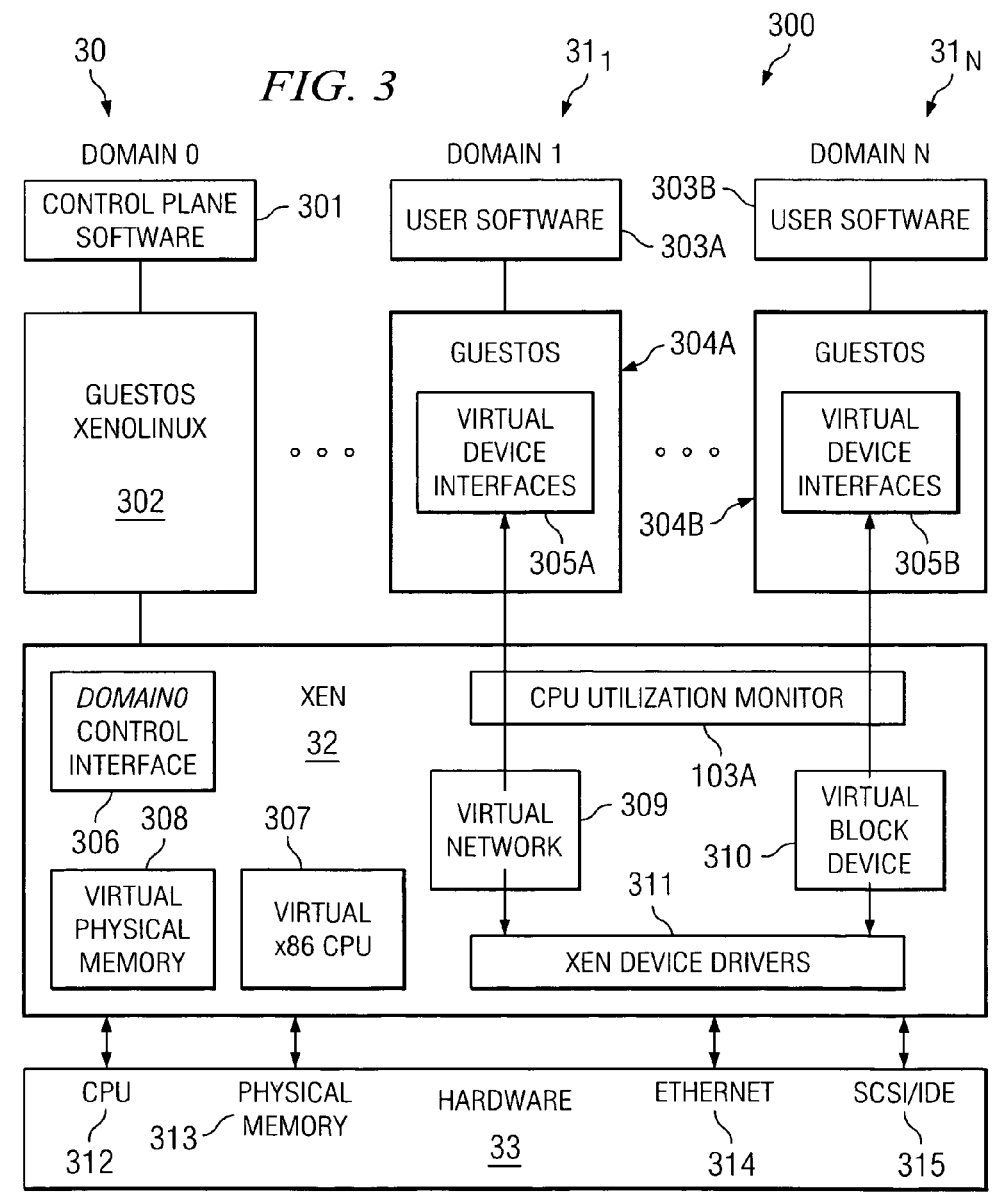
FIG. 3 shows a specific exemplary virtualization architecture implementing a CPU utilization monitor in accordance with an embodiment of the present invention.

Turning now to FIG. 3, an exemplary virtualization architecture implementing a CPU utilization monitor in accordance with an embodiment of the present invention is shown. More specifically, system 300 implements a known VMM architecture corresponding to that of XEN™, which is a VMM developed for the x86 platform. Of course, such known VMM architecture is adapted to include the CPU utilization monitoring functionality that is operable to attribute CPU utilization of the VMM to corresponding VMs, as described further below.

Exemplary system 300 includes a privileged management domain 30, referred to herein as "domain 0" (or "$Dom_0$"), which includes a guest OS (e.g., XenoLinux) 302 and one or more applications executing therein (e.g., control plane software) 301. System 300 further includes any number "N" of VMs or "domains" $31_1, \ldots, 31_N$ implemented thereon (referred to collectively as VMs or domains 31). Within each VM 31, a guest OS is executing, such as guest OS 304A in VM $31_1$ and guest OS 304B in VM $31_N$. Further, one or more applications may be executing within each VM 31, such as application 303A in VM $31_1$ and application 303B in VM $31_N$. VMM 32 is implemented, which is a software layer that virtualizes the available resources of computer system 300 and multiplexes them among the various VMs 31. System 300 further includes various shared hardware resources 33. Use of the hardware resources 33 is shared by the various VMs 31, wherein VMM 32 manages access to such shared hardware resources 33 by the various VMs 31. Such shared hardware resources 33 include CPU 312, physical memory 313, network interface (e.g., ethernet, etc.), such as ethernet ("enet") 314, and Small Computer System Interface (SCSI)/Integrated Drive Electronics (IDE) 315. VMM 32 virtualizes the shared resources, thus providing a virtual x86 CPU 307, virtual physical memory 308, virtual network 309, and virtual block storage devices (e.g., disks) 310. In addition to exporting virtualized instances of CPU, memory, network, and block storage devices, VMM 32 exposes a control interface 306 to set how these resources are shared between the running domains 31.

This exemplary XEN™ virtualization architecture does not completely virtualize the underlying hardware. Instead, it adapts some parts of the hosted guest OSs, such as OSs 304A and 304B, to work with the VMM (or "hypervisor") 32, and thus provides a paravirtualized architecture in which each guest OS is ported to a new target architecture, typically requiring changes in the machine-dependent code. For instance, each guest OS includes virtual device interfaces, such as virtual device interfaces 305A included in guest OS 304A of VM $31_1$ and virtual device interfaces 305B included in guest OS 304B of VM $31_N$, for communicating requests for access to certain shared hardware resources to the VMM 32. The user-level API of each VM is unchanged, allowing the existing binaries of applications, such as software applications 303A and 303B, to work unmodified.

The privileged management domain 30, "Domain 0," is created at boot time and is permitted to use the control interface 306. The control interface 306 provides the ability to create and terminate other domains 31, control the CPU scheduling parameters and resource allocation policies, etc.

Within the single host system 300 there are two levels of interface to a given resource: 1) at the bottom level is the raw physical interface between the VMM 32 and the hardware device (resource), and 2) above this is the virtualized interface that is presented to the VMs 31 (e.g., virtualized interfaces 307-310). These two levels of interfaces, while being logically similar, need not be identical. By making the existence of the VMM 32 non-transparent, as in paravirtualization, it creates additional opportunities for scheduling and filtering to individual VMs.

In this exemplary architecture, VMM 32 hosts the system device drivers 311 that enable access to certain shared resources. In this specific example, the device drivers 311 enable access to shared I/O resources, such as enet 314 and SCSI/IDE 315. As discussed further in concurrently U.S. patent application Ser. No. 11/070,605 titled "SYSTEM AND METHOD FOR ATTRIBUTING TO A CORRESPONDING VIRTUAL MACHINE CPU USAGE OF A DOMAIN IN WHICH A SHARED RESOURCE'S DEVICE DRIVER RESIDES" and Ser. No. 11/070,674 titled "SYSTEM AND METHOD FOR ATTRIBUTING TO A CORRESPONDING VIRTUAL MACHINE CPU USAGE OF AN ISOLATED DRIVER DOMAIN IN WHICH A SHARED RESOURCE'S DEVICE DRIVER RESIDES", the device drivers 311 may be implemented in the privileged management domain 30 or in isolated device driver domains in other known virtualization architectures, and the concepts described herein may be employed within any such virtualization architecture for attributing VMM CPU utilization to corresponding VMs.

As mentioned above, rather than emulating existing hardware devices, as is typically done in fully-virtualized environments, this exemplary XEN™ virtualization architecture exposes a set of clean and simple device abstractions. Thus, I/O data is transferred to and from each domain 31 via the XEN™ VMM 32, using shared-memory, asynchronous buffer descriptor rings.

Figure 4:
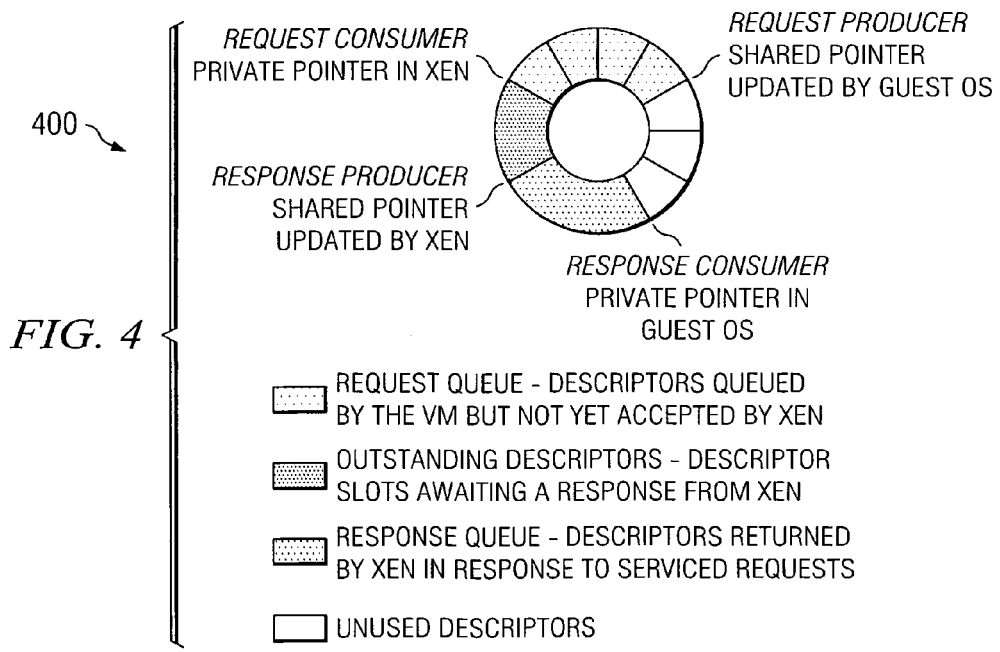
FIG. 4 shows a logical model of I/O descriptor rings typically employed by the exemplary VMM of FIG. 3.

Turning briefly to FIG. 4, the structure of I/O descriptor rings typically employed by the exemplary XEN™ VMM of FIG. 3 is shown. FIG. 4 provides a logical model (or representation) of the I/O data handling employed by the VMM 32 of FIG. 3. I/O descriptor ring 400 is a circular ring (queue) of descriptors with two pairs of producer-consumer pointers, which are allocated by a domain and accessed from within the XEN™ VMM 32. Thus, a separate I/O descriptor ring exists for each domain 31 in this exemplary embodiment. Further, for each domain 31, a separate I/O descriptor ring exists for each shared resource, in this exemplary embodiment. Descriptors do not directly contain I/O data, but instead I/O data buffers are allocated (provided) by the guest OS and indirectly referenced by I/O descriptors. When a request is placed in the descriptor ring 400 by a domain 31, the request producer pointer is advanced. When a request is removed by the XEN™ VMM 32, the request consumer pointer is advanced. Responses are placed back in the similar way. This structure is sufficiently generic to support a number of different device paradigms. Thus, for example, a set of "requests" can provide buffers for network packet reception; subsequent "responses" then signal the arrival of packets into these buffers.

Disk I/O is performed by placing requests in a ring buffer 400 then signaling the VMM 32 to process them. The VMM 32 then replaces the requests with responses and signals their presence by calling an asynchronous event handler with the BLKDEV bit set in events. There is just one I/O ring buffer that is shared among all the virtual disks.

Like disk I/O, network I/O is performed by placing requests in a ring buffer 400 and then signaling the VMM 32 to process them. The VMM 32 then replaces the requests with responses and signals their presence by calling an asynchronous event handler with the EVENT_NET bit set in events.

Unlike disk I/O, however, there is a separate ring 400 for each virtual network interface the domain can access, and the receive and transmit are separated. This makes sense from the standpoint that if the system has one very active interface and one relatively inactive one, it would be undesirable to have requests from the inactive interface interfacing with requests from the active one and vice-versa. Each interface operates independently.

To transmit a packet, the guest OS simply enqueues a buffer descriptor onto the transmit ring 400. The XEN™ VMM 32 copies the descriptor and, to ensure safety, then copies the header and executes any matching filter rules. The packet payload is not copied, but rather the scatter-gather DMA is used (with the relevant page frames being pinned until transmission is complete).

To efficiently implement a packet reception, the guest OS exchanges an unused page frame for each packet it receives to avoid copying the packets between the XEN™ VMM 32 and the guest domain. Thus, when a packet is received, the XEN™ VMM 32 checks the set of receive rules to determine the destination virtual interface, and exchange the packet buffer for a page on the relevant receive ring 400. When no frame is available, the packet is dropped.

In order to avoid the overhead of copying I/O data to/from the guest VM, the XEN™ VMM 32 implements the "page-flipping" technique, where the memory page containing the I/O data in the XEN™ VMM 32 is exchanged with an unused page provided by the guest OS. As described further below, certain embodiments of the present invention actively exploits this feature to observe I/O communications between the guest domains and the XEN™ VMM 32.

The above description of the XEN™ virtualization architecture and communication model of FIGS. 3 and 4 are intended merely as an example of a known virtualization architecture in which embodiments of the present invention may be employed. Thus, the above-described XEN™ virtualization architecture of FIGS. 3 and 4 are known in the art, and embodiments of a CPU utilization monitor, such as CPU utilization monitor 103A, may be employed in such virtualization architecture in the manner described further below. Of course, embodiments of the present invention are not limited to application within the above-described exemplary virtualization architecture. Rather, embodiments of the present invention for attributing VMM CPU utilization to corresponding VMs may be employed in any virtualization architecture, which may employ device drivers in any location within the system (e.g., not necessarily within the VMM as in FIG. 3). Further, embodiments of the present invention may be employed within a virtualization architecture that uses any communication scheme between the VMs and the VMM for accessing a shared resource. Thus, embodiments of the present invention are not limited to application within a virtualization architecture that employs the exemplary descriptor ring of FIG. 4 or that employs the above-described page-flipping communication scheme. While the page-flipping scheme is used in the above exemplary virtualization architecture, and thus an exemplary technique is provided below for monitoring such page-flipping communications in order to attribute VMM CPU utilization to corresponding VMs, the concepts presented herein may be readily employed with any communication scheme, including without limitation a data copying communication scheme.

The exemplary virtualized system 300 of FIG. 3 is adapted in accordance with one embodiment of the present invention to include CPU utilization monitor 103A. CPU utilization monitor 103A is operable to observe communication between the VMs 31 and the VMM 32, and determine, based on such observed communication, a corresponding amount of CPU utilization of VMM 32 that is attributable to each of the VMs 31 (i.e., CPU utilization monitor 103A allocates the VMM's CPU utilization among the various VMs 31 in a fair manner). More specifically, in this example, the communication between the virtual device interfaces 305A, 305B of the guest OSs, and the device drivers 311 that are implemented in the VMM 32 is monitored by CPU utilization monitor 103A in order to attribute CPU utilization of VMM 32 to the corresponding VM 31 that caused such CPU utilization.

Figure 5:
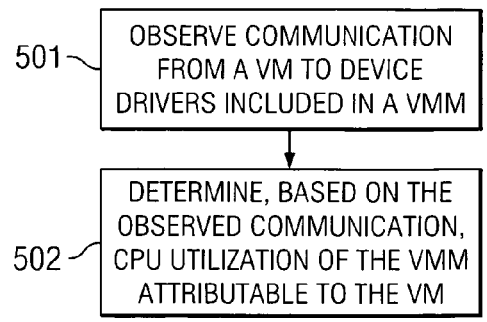
FIG. 5 shows an exemplary operational flow according to one embodiment for attributing CPU utilization of a VMM to corresponding VMs in a virtualization architecture, such as that of FIG. 3, in which device drivers are implemented in the VMM.

Turning to FIG. 5, an exemplary operational flow of CPU utilization monitor 103A according to one embodiment is shown. In operational block 501, CPU utilization monitor 103A observes communication from a VM 31 to device drivers 311 included in the VMM 32. As described further herein, in certain embodiments the communication observed is resource access requests from the VMs 31 (e.g., from the virtual device interfaces 305A, 305B of the guest OSs) to the device drivers 311. In operational block 502, CPU utilization monitor 103A determines, based on the observed communication, CPU utilization of the VMM 32 that is attributable to the VM 31. Accordingly, by monitoring the communications from each of the VMs $31_1, \ldots, 31_N$ to the device drivers 311 included in VMM 32, CPU utilization monitor 103A is capable of attributing the corresponding amount of CPU utilization of the VMM 32 (including the CPU utilization of device drivers 311) that is used for processing such communications to the appropriate VMs $31_1, \ldots, 31_N$ that caused such processing. Exemplary techniques that may be employed for determining the amount of CPU utilization to be attributed to each VM based on such observed communications are described further below. Accordingly, this exemplary embodiment of the present invention provides a monitoring system that enables more accurate accounting of the CPU used by different guest VMs.

An exemplary technique for determining CPU utilization to be attributed to each VM 31 that may be employed by CPU utilization monitor 103A in accordance with one embodiment of the present invention is described in further detail below with reference to the flow diagram of FIG. 6. For explanation of this exemplary technique, let $Dom_0$, $Dom_1$, $Dom_k$ be virtual machines 31 that share the host system 300, while $Dom_0$ is a privileged management domain 30. Also, let $Dom_{idle}$ denote a special idle domain that "executes" on the CPU when there are no other runnable domains (i.e. there is no virtual machine that is not blocked and not idle). $Dom_{idle}$ is analogous to the "idle-loop process" executed by an OS when there are no other runnable processes.

In operational block 61, the CPU utilization monitor 103A determines the CPU utilization allocated by the scheduler to each VM 31. For instance, traditional CPU utilization monitoring systems, such as is provided by VMWARE™ and other commercial products, typically measure the amount of CPU utilization allocated by the scheduler for an execution of a particular VM over time. This is a relatively straightforward approach and typically utilizes instrumentation of the CPU scheduler in the VMM 32. Such an instrumentation results in the following CPU usage recording:
$(Dom_{i_1}, t_1, t_2), (Dom_{i_2}, t_3, t_4), (Dom_{idle}, t_5, t_6), \ldots, (Dom_{i_K}, t_{n-1}, t_n)$, where the tuple $Dom_{i_K}, t_{n-1}, t_n)$, means that virtual machine $Dom_{i_K}$ was using the CPU starting at time $t_{n-1}$ and ending at time $t_n$.

A more convenient and detailed data structure that provides a similar functionality keeps such information per guest domain $Dom_i$, and indicates the state of the domain. At any point of time, guest domain $Dom_i$ can be in one of the following three states: 1) execution state: domain $Dom_i$ is currently using the CPU; 2) runnable state: domain $Dom_i$ is not currently using the CPU but is on the run queue and waiting to be scheduled for execution on the CPU; or 3) blocked state: domain $Dom_i$ is blocked and is not on the run queue (once unblocked it is put back on the run queue).

For each $Dom_i$, a sequence of data describing the timing of domain state changes is collected as follows:
$Dom_i:(t_1^i, t_2^i, \text{execution}), (t_2^i, t_3^i, \text{runnable}), (t_5^i, t_6^i, \text{execution}), (t_6^i, t_7^i, \text{blocked}), (t_7^i, t_8^i, \text{runnable}), \ldots$ By having such a data structure, it is easy to compute a share of CPU which was allocated to $Dom_i$ over time $T=(T_1, T_2)$, as follows:

$$Dom_i^T(CPU) = \sum_{t_1 \geq T_1}^{t_2 \leq T_2} (t_1^i, t_2^i, \text{execution})/(T_2 - T_1).$$

Figure 6:
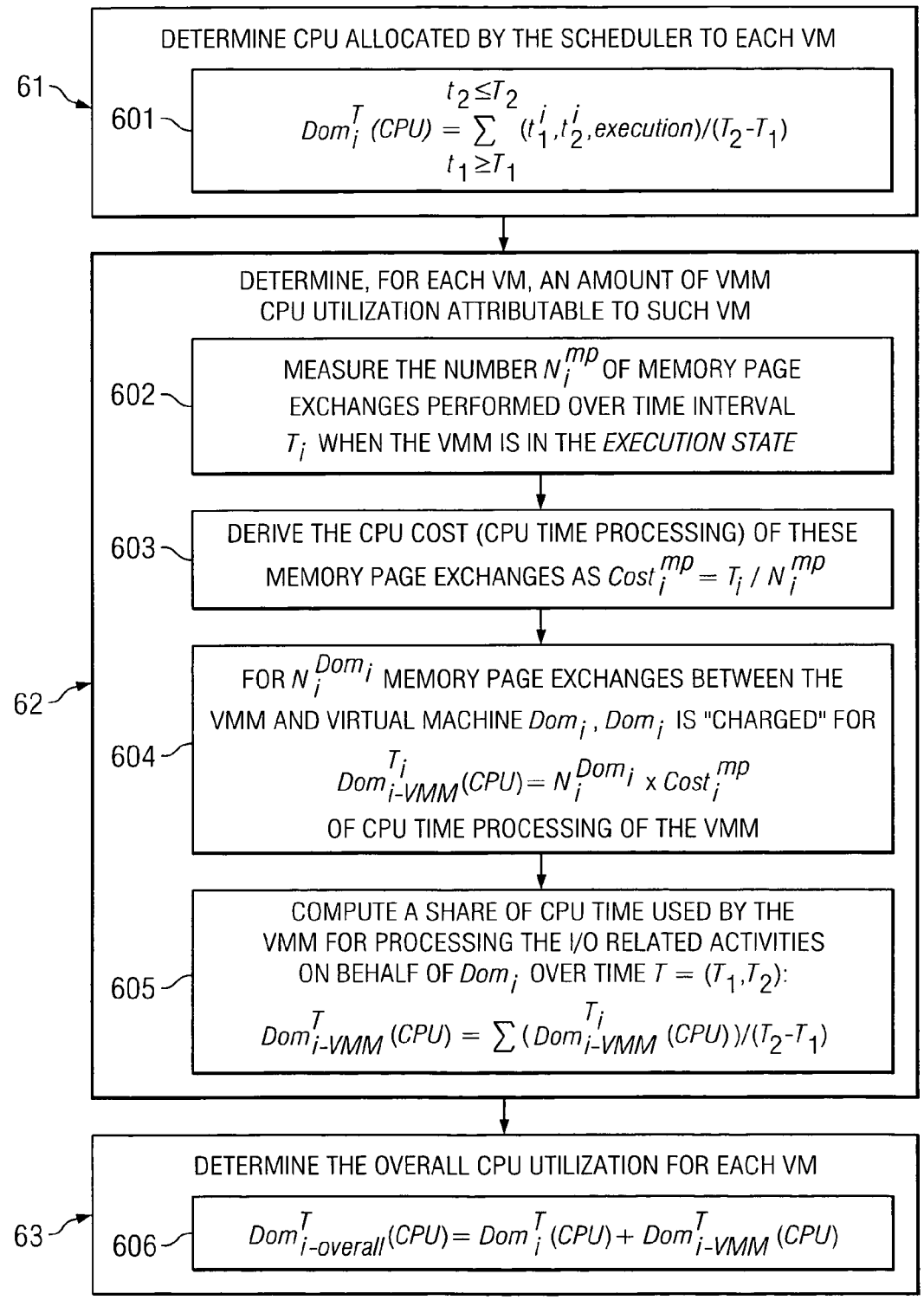
FIG. 6 shows a detailed operational flow diagram for determining CPU utilization to be attributed to each VM in a virtualization architecture, such as that of FIG. 3, in accordance with one embodiment of the present invention.

Thus, in the exemplary embodiment of FIG. 6, operational block 61 includes use of the above computation in sub-operational block 601, in order to determine the CPU allocated by the scheduler to each VM.

In one embodiment of the monitoring system, a time interval T=100 milliseconds (ms) is used to aggregate overall CPU usage across different VMs, i.e. $T_2=T_1+100$ ms. Of course, in alternative embodiment, any other time interval can be used in the monitoring process, and thus embodiments of the present invention are not limited to using the 100 ms time interval.

There is one entity in the system 300 which uses the CPU but is not instrumented directly by this exemplary embodiment: it is the VMM 32 itself. However, as described further below, the CPU utilization of the VMM 32 can be easily derived in this embodiment of the monitoring system, and such VMM's CPU utilization can be fairly allocated to the corresponding VMs for which the VMM is using the CPU.

In this embodiment, a constantly updated timestamp, $T_{end}^{exec}$, is maintained, which reflects the time when the domain that is currently using the CPU (i.e. is in execution state) is descheduled, i.e. when the domain changes from execution state to runnable or blocked state. For example, assume $Dom_i$ is scheduled for execution at time $t_{j_1}$ and descheduled at time $t_{j_2}$. Then $T_{end}^{exec}=t_{j_2}$. Further, assume $Dom_j$ is scheduled for execution at time $t_{j_1}(t_{j_2} \leq t_{j_1})$ and there is not any other domain that is scheduled in between $t_{j_2}$ and $t_{j_1}$, then time interval $(t_{j_2}, t_{j_1})$ is charged to be an execution time of the VMM, i.e. time interval $(t_{j_2}, t_{j_1})$ corresponds to the VMM being in an execution state. Now, assume $Dom_j$ is descheduled at time $t_{j_2}$. Then $T_{end}^{exec}=t_{j_2}$.

In such away, the CPU usage by the VMM, $Dom_0, Dom_1, \ldots, Dom_k$ and $Dom_{idle}$ can be computed over any time interval. However, this method might not reveal the "true" usage of the CPU by different VMs. The reason is that virtualization of I/O devices results in an I/O model where the data transfer process involves additional system components, e.g. the VMM. Note that in the exemplary system of FIG. 3 the VMM 32 "hosts" the shared device drivers 311 that support I/O processing. Hence, the CPU usage when the VMM 32 handles the I/O data on behalf of the particular VM 31 should be charged to the corresponding VM 31.

While it seems to be a well-defined problem, it becomes desirable to provide a light-weight way to accurately instrument all the activities performed by the VMM 32, including the device drivers 311, on behalf of the corresponding VMs 31. A straightforward instrumentation of I/O-related activities in the VMM 32 and the device drivers 311 for explicit accounting of this processing charged to a particular to VM 31 inevitably leads to a heavy-weight monitoring solution with significant overhead of its own.

An embodiment of the present invention provides a light-weight support monitoring system. Thus, instead of instrumenting the low-level OS and device drivers activities, the exemplary approach of an embodiment of the present invention observes the amount of I/O communications per domain, and uses the observed communications for partitioning the VMM CPU usage across the VMs 31. Thus, in operational block 62 of FIG. 6, the CPU utilization monitor 103A determines, for each VM 31, an amount of VMM CPU utilization that is attributable to such VM 31. As mentioned above, and discussed further below, certain embodiments provide a light-weight monitoring technique, in which the CPU utilization monitor observes the amount of I/O communications with the VMM per domain, and uses the observed communications for attributing an appropriate amount of the VMM CPU usage to each of the VMs 31.

As mentioned above, in order to avoid the overhead of copying I/O data to/from the guest VM 31, the XEN™ VMM 32 implements the "page-flipping" technique, where the memory page containing the corresponding I/O data is exchanged with an unused page provided by the guest OS. Thus, in order to account for different I/O related activities in the VMM 32 (that "hosts" the unmodified device drivers 311), CPU utilization monitor 103A observes the memory page exchanges between the VMM 32 and corresponding Domi 31. Thus, in this exemplary embodiment, CPU utilization monitor 103A, in sub-operational block 602, measures the number of memory page exchanges performed over time interval Ti when the VMM 32 is in the execution state. In sub-operational block 603, the CPU cost (CPU time processing) of these memory page exchanges is derived as. After that, if there are memory page exchanges between the VMM and virtual machine Domi, then Domi is "charged" for of CPU time processing of the VMM 32, in sub-operational block 604. In this way, the CPU utilization monitor 103A can partition the CPU time Ti used by the VMM 32 for processing the I/O-related activities and "charge" the corresponding VM 31 that caused these I/O activities.

Thus, in sub-operational block 605, the CPU utilization monitor 103A computes a share of CPU time used by the VMM 32 for processing the I/O-related activities on behalf of $Dom_i$ 31 over time $T=(T_1, T_2)$ as:

$$Dom_{i-VMM}^{T}(CPU) = \sum_{T_i \in T} \left(Dom_{i-VMM}^{T_i}(CPU)\right) / (T_2 - T_1),$$

where for any time intervals $T_i = (t_{i_1}, t_{i_2})$ and $T = (T_1, T_2)$, the definition $T_i \in T$ means that $t_{i_1} \geq T_1$ and $t_{i_2} \leq T_2$.

In operational block 63, the overall CPU utilization attributable to each VM 31 is computed by the CPU utilization monitor 103A. That is, an overall share of CPU utilization which was allocated to $Dom_i$ 31 over time T includes the share of CPU time that is directly allocated by a scheduler (i.e. $Dom_i^T(CPU)$) (as determined in operational block 61) and the share of CPU time that is used by the VMM 32 for processing the I/O-related activities on behalf of $Dom_i$ (i.e. $Dom_{i-VMM}^T(CPU)$) (as determined in operational block 62). Thus, the overall CPU utilization of $Dom_i$ is computed in sub-operational block 606 as: $Dom_{i-overall}^T(CPU) = Dom_i^T(CPU) + Dom_{i-VMM}^T(CPU)$. As mentioned above, in certain embodiments of the monitoring system, a time interval of 100 ms is used to aggregate overall CPU usage across different VMs. However, in alternative embodiments, any other suitable time interval may be used instead.

The exemplary operational flow of FIG. 6 may be implemented as computer-executable software code that is stored to a computer-readable medium, thus implementing CPU utilization monitor 103A in certain embodiments. Of course, in certain embodiments the operational blocks 61-63 may be performed in any desired manner, and thus are not limited to use of the specific exemplary sub-operational blocks 601-606 described above.

The I/O rings 400 described in FIG. 4 are used for I/O subsystem virtualization in the XEN™ VMM 32 of the exemplary system 300 of FIG. 3. All the I/O communications initiated by Domi (or destined to Domi) pass through the VMM 32 on a way from the guest VMs 31 to devices (i.e., the shared resources). Thus, for each Domi, one can count the number of requests put on all the I/O rings between the Domi and the VMM. This may provide an alternative way to implement the monitoring system for observing the amount of I/O traffic processed by the VMM on behalf of different domains.

Also, as mentioned above, in certain embodiments some method other than the above-described page-flipping technique may be used to implement the I/O communication model in a virtualized environment. For instance, in some implementations, instead of memory page exchanges between the VMM and VMs, another (e.g., less-efficient) way of copying data between the VMM and VMs may be employed. The above-described CPU utilization monitor is readily modifiable to count the number of copies in a similar way as described above for counting the number of memory page exchanges. Thus, the techniques described herein can be readily adapted for use in observing any communication scheme that may be employed between VMs and a VMM.

What is claimed is:

1. A method comprising:
    observing communication from a given virtual machine (VM) of a plurality of VMs, to a virtual machine monitor (VMM), by observing communication from said VM that is requesting access to a resource, as an access request for said VM by said VMM; and
    determining, based on said communication, utilization of the CPU by said VMM specifically attributable to said VM, and not attributable to any other of the plurality of VMs, wherein the utilization of the CPU by said VMM is the utilization of the CPU by said VMM performed for processing said access request for said VM by said VMM.

2. The method of claim 1 wherein said observing communication further comprises:
    observing communication that is directed from said VM to said VMM.

3. The method of claim 1 wherein said observing communication further comprises:
    observing communication from said VM that is intercepted by said VMM.

4. The method of claim 1 wherein said VM is a fully virtualized VM.

5. The method of claim 1 wherein said VM is a paravirtualized VM.

6. The method of claim 1 wherein the resource that is shared by and accessible by the plurality of VMs.

7. The method of claim 1 wherein said observing communication comprises:
    observing communication from said VM that is requesting access to an input/output (I/O) resource.

8. The method of claim 7 wherein said determining comprises:
    determining CPU utilization of said VMM attributable to said VM as the CPU utilization of said VMM performed for processing said access request for said VM.

9. The method of claim 8 wherein said VMM includes a device driver for said resource, and wherein said observing communication comprises:
    observing communication between said VM and said device driver.

10. The method of claim 1 wherein said observing communication further comprises:
    observing memory page exchanges between said VM and said VMM.

11. The method of claim 1 wherein said observing communication further comprises:
    observing data copying between said VM and said VMM.

12. The method of claim 1 further comprising:
    observing communication from each of the plurality of VMs to the VMM; and
    determining, for each of said VMs, based on said communication, CPU utilization of said VMM attributable to such VM.

13. A method comprising:
    a plurality of virtual machines (VMs) communicating with a virtual machine monitor (VMM) for requesting resource access; and
    determining CPU utilization of each VM, wherein said determining includes:
        observing communication from said VMs and said VMM that is requesting access to a resource as access requests for said VMs by said VMM;
        determining CPU utilization of said VMM attributable to each of said VMs,
    wherein the CPU utilization of each VM is the utilization of the CPU by said VMM performed for processing said access request for said VM by said VMM.

14. The method of claim 13 wherein said VMM includes a device driver for said resource, and wherein said observing communication further comprises:
    observing communication between said VMs and said device driver.

15. The method of claim 13 wherein said observing communication further comprises:
    observing memory page exchanges between said VMs and said VMM.

16. The method of claim 13 wherein said observing communication further comprises:
   observing data copying between said VMs and said VMM.

17. The method of claim 13 wherein said resource is a shared resource that is accessible by said plurality of VMs.

18. A method comprising:
   determining, for each of a plurality of virtual machines (VMs), CPU utilization allocated by a scheduler to such VM;
   determining, for each of said VMs, an amount of virtual machine monitor (VMM) CPU utilization specifically attributable to each VM, and not attributable to any other of the plurality of VMs, by observing communication from said VMs that are requesting access to a resource, as access requests for said VMs by said VMM; and
   determining, for each of said VMs, total CPU utilization attributable to such VM by summing the determined CPU utilization allocated to the VM by the scheduler and the determined amount of VMM CPU utilization attributable to the VM,
   wherein the determined CPU utilization by said VMM includes utilization of the CPU by said VMM performed for processing said access requests for said VMs by said VMM.

19. The method of claim 18 wherein said determining CPU utilization allocated by said scheduler to a VM comprises: computing $$Dom_i^T(CPU) = \sum_{t_1 \geq T_1}^{t_2 \leq T_2} (t_1^i, t_2^i, \text{execution})/(T_2 - T_1),$$

wherein i is a variable identifying one of the plurality of VMs, T is a time interval from time $T_1$ to time $T_2$, $Dom_i^T$ (CPU) corresponds to CPU utilization scheduled for VM i of the plurality of VMs for time T, $t_1^i$ corresponds to a time at which VM i is scheduled for execution, and $t_2^i$ corresponds to a time at which VM i is descheduled from execution.

20. The method of claim 18 wherein said determining an amount of VMM CPU utilization attributable to a VM comprises:
   measuring a number ($N_i^{mp}$) of memory page exchanges performed over a time interval), ($T_i$), wherein i is a variable identifying one of the plurality of VMs.

21. The method of claim 20 wherein said measuring comprises measuring the number of memory page exchanges performed when the VMM is in an execution state.

22. The method of claim 20 wherein said determining an amount of VMM CPU utilization attributable to a VM further comprises:
   deriving a CPU cost of the memory page exchanges as $Cost_i^{mp} = T_i/N_i^{mp}$.

23. The method of claim 22 wherein said determining an amount of VMM CPU utilization attributable to a VM further comprises:
   for $N_i^{Dom_i}$ memory page exchanges between the VMM and VM i, charging VM i for $Dom_{i-VMM}^{T_i}$ processing of the VMM (CPU)=$N_i^{Dom_i} \times Cost_i^{mp}$ of CPU time processing of the VMM.

24. The method of claim 23 wherein said determining an amount of VMM CPU utilization attributable to a VM further comprises:
   computing a share of CPU time used by the VMM for processing resource access activities on behalf of a VM i over time $T=(T_1, T_2)$ as $$Dom_{i-VMM}^T(CPU) = \sum_{T_i \in T} \left(Dom_{i-VMM}^{T_i}(CPU)\right)/(T_2 - T_1).$$

25. A system comprising:
   Central Processing Unit (CPU);
   Virtual Machines (VMs);
   Virtual Machine Monitor (VMM) operable to receive requests for resource access from said VMs; and
   a CPU utilization monitor operable to determine an amount of CPU utilization of said VMM in processing said received requests that is attributable to each of said VMs, by:
      observing communication from said VMs that is requesting access to a resource, as access requests for said VMs by said VMM;
      determining, based on said communication, utilization of the CPU by said VMM specifically attributable to said VM, and not attributable to any other of said VMs,
   wherein the utilization of the CPU by said VMM is the utilization of the CPU by said VMM performed for processing said access requests for said VMs by said VMM.

26. The system of claim 25 further comprising shared resources that are accessible by each of said VMs.

27. The system of claim 25 wherein said VMM includes a device driver for a shared resource that is accessible by each of said VMs.

28. The system of claim 27 wherein said CPU utilization monitor observes communication from said VMs to said device driver, and wherein said CPU utilization monitor uses said observed communication for determining the amount of CPU utilization of said VMM in processing said received requests that is attributable to each of said VMs.

29. A non-transitory computer-readable medium storing computer-executable software code executable by a processor, said computer-executable software code comprising:
   code for observing communication from a virtual machine (VM) to a virtual machine monitor (VMM) by observing communication from said VM that is requesting access to a resource, as an access request for said VM by said VMM; and
   code for determining, based on said communication, utilization of the CPU by said VMM specifically attributable to said VM, and not attributable to any other of the plurality of VMs,
   wherein the utilization of the CPU by said VMM is the utilization of the CPU by said VMM performed for processing said access request for said VM by said VMM.

30. The non-transitory computer-readable medium of claim 29 wherein said code for observing communication comprises:
   code for observing communication from said VM that is requesting access to a shared resource that is accessible by a plurality of VMs.

31. The non-transitory computer-readable medium of claim 29 wherein said VMM includes a device driver for said resource, and wherein said code for observing communication comprises:
   code for observing communication between said VM and said device driver.

32. The non-transitory computer-readable medium of claim 29 wherein said code for observing communication comprises:
   code for observing memory page exchanges between said VM and said VMM.

* * * * *